L. McMURRAY.
Sheet Metal Can.

No. 237,301.

Patented Feb. 1, 1881.

Witnesses,
DeL. H. Barclay
Talbot Foard

Inventor,
LOUIS McMURRAY by
N. D. Williams
Attorney.

UNITED STATES PATENT OFFICE.

LOUIS McMURRAY, OF BALTIMORE, MARYLAND.

SHEET-METAL CAN.

SPECIFICATION forming part of Letters Patent No. 237,301, dated February 1, 1881.

Application filed November 10, 1879.

*To all whom it may concern:*

Be it known that I, LOUIS MCMURRAY, of Baltimore city, State of Maryland, have invented certain new and useful Improvements in Sheet-Metal Cans; and I hereby declare the same to be fully, clearly, and exactly described as follows, reference being had to the accompanying drawings, in which—

Figure 1:
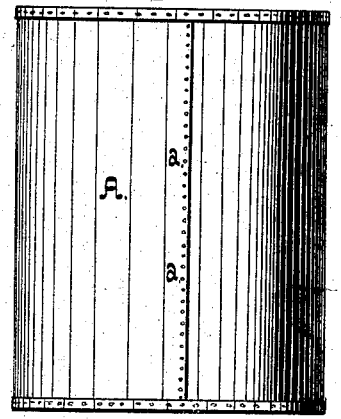
Figure 2:
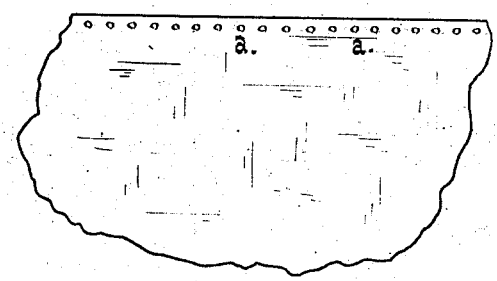
Figure 3:
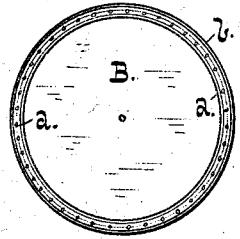

Figure 1 is a side elevation of a can embodying my present invention. Fig. 2 is a plan view of a portion of the blank; Fig. 3, a similar view of the can-cap, and Fig. 4 a central sectional view of the can cap and top.

My invention has for its object to secure the maximum degree of strength of the soldered seams of the can, and incidentally an economy of solder, and obviate the tendency of the cans to burst while "processing" their contents. In this step, with cans of the usual construction, the same are liable to open at the side seam or at the heads. I have found that by forming a series of holes in all of the edges of the wall-blank, or, in lieu of those portions of the series which are in the side edges of the blank, a line of holes in the crimped edges of the heads and soldering therethrough, a degree of strength is secured which obviates all danger of bursting the can. Experience has shown that this feature results in securing, incidentally, an economy of solder.

In the accompanying drawings, A is an ordinary provision-can, differing from those in common use only in having a line of perforations, $a$, in the edge of the sheet. These may be formed in one or both edges of the sheets, by preference in one only, as a degree of strength of joint is thereby secured which answers every requisite.

The cap B, instead of being simply turned over at the edge, is slightly curved, as shown in Fig. 4, conforming to the groove $c$ in the can-cover C, and the line of holes $a$ is formed so as to come over the lowest portion of the groove. The holes, in the process of soldering, furnish so many ducts leading directly to the contact-surfaces desired to be attached together, and when the process is complete the parts are practically riveted together by reason of the solder filling the holes. Aside from the functional advantage of the holes in these respects, it is found that they effect a saving of from fifty to seventy-five per cent. of solder, the waste in the ordinary process of soldering being enormous, and due mainly to the necessity for a liberal application of solder to the joint in order to insure its filling the same from end to end and leaving no unsoldered points. Economy of time and labor is a natural result of the economy of material and facility afforded by the holes for the access of the solder to the joint. The line of holes in the curved edge of the cap is filled by the minimum of material, and, being, by preference, punched from the outer side, offers no obstacle to the edge of the soldering-tool. As the formation of the holes is not attended with any expense, (they are punched coincidently with the stamping out of the blanks,) the economy referred to, in point of time and material, is clear gain over the heretofore-practiced method of soldering.

I am aware that it is not broadly new to punch a series of holes in the edges of metallic sheets to be joined by solder; but I am not aware and do not believe that prior to my invention the seams of cans have been so secured, and that the advantages, in point of immunity from danger of bursting and economy of solder, have been attained.

So I claim—

As a new article of manufacture, a sheet-metal can in all of whose seams is formed a line of perforations filled with the solder that unites the contact-surfaces, as and for the purpose set forth.

LOUIS McMURRAY.

Witnesses:
R. D. WILLIAMS,
TALBOT FOARD.